United States Patent
Yang

(10) Patent No.: US 10,616,499 B2
(45) Date of Patent: Apr. 7, 2020

(54) METHOD AND DEVICE FOR CAPTURING HIGH DYNAMIC RANGE IMAGE, AND ELECTRONIC DEVICE

(71) Applicant: GUANGDONG OPPO MOBILE TELECOMMUNICATIONS CORP., LTD., Dongguan, Guangdong (CN)

(72) Inventor: Xinqin Yang, Guangdong (CN)

(73) Assignee: GUANGDONG OPPO MOBILE TELECOMMUNICATIONS CORP., LTD., Dongguan, Guangdong (CN)

(*) Notice: Subject to any disclaimer, the term of this patent is extended or adjusted under 35 U.S.C. 154(b) by 0 days.

(21) Appl. No.: 16/435,538

(22) Filed: Jun. 9, 2019

(65) Prior Publication Data

US 2019/0297247 A1 Sep. 26, 2019

Related U.S. Application Data

(63) Continuation of application No. 16/311,352, filed as application No. PCT/CN2017/080140 on Apr. 11, 2017.

(30) Foreign Application Priority Data

Jul. 29, 2016 (CN) .......................... 2016 1 0616167

(51) Int. Cl.
*H04N 5/235* (2006.01)
*G06T 5/50* (2006.01)
(Continued)

(52) U.S. Cl.
CPC .......... *H04N 5/2355* (2013.01); *G06T 5/009* (2013.01); *G06T 5/50* (2013.01); *H04N 5/235* (2013.01);
(Continued)

(58) Field of Classification Search
CPC .......... H04N 5/2355; H04N 5/235–243; G06T 5/009; G06T 5/50; G06T 2207/20208;
(Continued)

(56) References Cited

U.S. PATENT DOCUMENTS

| 5,828,793 A | 10/1998 | Mann |
| 2006/0023273 A1* | 2/2006 | Kato .................... H04N 1/4074 358/519 |

(Continued)

FOREIGN PATENT DOCUMENTS

| CN | 1451230 | 10/2003 |
| CN | 1936640 | 3/2007 |

(Continued)

OTHER PUBLICATIONS

SIPO, First Office Action for CN Application No. 201610616167, dated May 10, 2017.

(Continued)

*Primary Examiner* — Mekonnen D Dagnew
(74) *Attorney, Agent, or Firm* — Hodgson Russ LLP

(57) ABSTRACT

Embodiments of the present disclosure provide a method and a device for capturing a high dynamic range image, and an electronic device. The method includes the followings. A brightness distribution type of a raw image is detected, in which the raw image is captured after a central region of a field of view of an imaging system is exposed at an initial position. An image sensor of the imaging system is moved to one or more reference positions according to the brightness distribution type and a preset movement distance. One or more reference images are captured after the central region is exposed at the one or more reference positions. A high dynamic range image is obtained by compositing the one or more reference images and the raw image.

12 Claims, 9 Drawing Sheets detecting a brightness distribution type of a raw image captured after a central region of a field of view of an imaging system is exposed at an initial position — 110 controlling an image sensor of the imaging system to move to one or more reference positions according to the brightness distribution type and a preset movement distance, and capturing one or more reference images after the central region is exposed at the one or more reference positions — 120 obtaining the high dynamic range image by compositing the one or more reference images and the raw image — 130

(51) Int. Cl.
*G06T 5/00* (2006.01)
*H04N 5/355* (2011.01)

(52) U.S. Cl.
CPC ... *H04N 5/355* (2013.01); *G06T 2207/20208* (2013.01); *G06T 2207/20216* (2013.01)

(58) Field of Classification Search
CPC ...... G06T 2207/20216; G03B 7/00–28; G03B 9/58–62; G03B 2207/00–005
See application file for complete search history.

(56) References Cited

U.S. PATENT DOCUMENTS

| | | |
|---|---|---|
| 2006/0187314 A1 | 8/2006 | Fujie et al. |
| 2009/0295973 A1 | 12/2009 | Oshikubo et al. |
| 2010/0295961 A1 | 11/2010 | Terauchi |
| 2012/0281126 A1 | 11/2012 | Fossum |
| 2015/0373252 A1 | 12/2015 | Georgiev |
| 2016/0014338 A1 | 1/2016 | Ozluturk |
| 2016/0182887 A1 | 6/2016 | Gutierrez |
| 2016/0366335 A1* | 12/2016 | Miyata ............... H04N 5/23232 |

FOREIGN PATENT DOCUMENTS

| | | |
|---|---|---|
| CN | 101360192 | 2/2009 |
| CN | 101496393 | 7/2009 |
| CN | 101622862 | 1/2010 |
| CN | 101888487 | 11/2010 |
| CN | 102098444 | 6/2011 |
| CN | 102348066 | 2/2012 |
| CN | 103516984 | 1/2014 |
| CN | 104079837 | 10/2014 |
| CN | 104581345 | 4/2015 |
| CN | 105428375 | 3/2016 |
| CN | 106161979 | 11/2016 |
| WO | 2007100002 | 9/2007 |

OTHER PUBLICATIONS

SIPO, Notification to Grant Patent Right for Invention for CN Application No. 201610616167, dated Jul. 10, 2017.
WIPO, ISR for PCT/CN2017/080140, dated Jun. 26, 2017.
EPO, Office Action for EP Application No. 17833240.9, dated Jun. 18, 2019.

* cited by examiner

METHOD AND DEVICE FOR CAPTURING HIGH DYNAMIC RANGE IMAGE, AND ELECTRONIC DEVICE

CROSS REFERENCE TO RELATED APPLICATIONS

This application is a continuation of U.S. application Ser. No. 16/311,352, filed Dec. 19, 2018, which is a U.S. National Stage Entry of International Application No. PCT/CN2017/080140, filed Apr. 11, 2017, which claims priority to Chinese Patent Application No. 201610616167.X, filed Jul. 29, 2016. The entire disclosures of the aforementioned applications are incorporated herein by reference.

TECHNICAL FIELD

The present disclosure relates to the field of the photographing technologies, and more particular to a method and a device for capturing a high dynamic range image and an electronic device.

BACKGROUND

High dynamic range imaging (HDR) is a kind of photographing technology used to realize a higher exposure dynamic range (i.e., a higher brightness-darkness difference) than a conventional digital image technology. A purpose of the high dynamic range imaging is to accurately represent brightness in the real world within a range from direct sunlight to darkest shadows. A captured image can clearly present details of the scene, including a high-light region and a shadow region. Therefore, an effect presented by the image is close to a vision effect of human eyes.

SUMMARY

Embodiments of the present disclosure provide a method for capturing a high dynamic range image, a device for capturing a high dynamic range image and an electronic device.

The method includes: detecting a brightness distribution type of a raw image captured after a central region of a field of view of an imaging system is exposed by at an initial position; controlling an image sensor of the imaging system to move to one or more reference positions according to the brightness distribution type and a preset movement distance, and capturing one or more reference images after the central region is exposed at the one or more reference positions; and obtaining the high dynamic range image by compositing the one or more reference images and the raw image.

The device includes: a processor and a memory configured to store instructions executable by the processor stored thereon, in which the processor is configured to detect a brightness distribution type of a raw image captured after a central region of a field of view of an imaging system is exposed at an initial position; control an image sensor of the imaging system to move to one or more reference positions according to the brightness distribution type and a preset movement distance; capture one or more reference images after the central region is exposed at the one or more reference positions; and obtain the high dynamic range image by compositing the one or more reference images and the raw image.

The electronic device includes a housing, an imaging system having an image sensor, a memory and a processor, wherein the imaging system, the memory and the processor are arranged in the housing, the processor is configured to run programs corresponding to executable program codes by reading the executable program codes stored in the memory, to: detect a brightness distribution type of a raw image captured after a central region of a field of view of the imaging system is exposed at an initial position; control the image sensor to move to one or more reference positions according to the brightness distribution type and a preset movement distance, and capture one or more reference images after the central region is exposed at the one or more reference positions; and obtain the high dynamic range image by compositing the one or more reference images and the raw image.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

The above and/or additional aspects and advantages of embodiments of the present disclosure will become apparent and more readily appreciated from the following descriptions made with reference to the drawings, in which.

DETAILED DESCRIPTION

Figure 1:
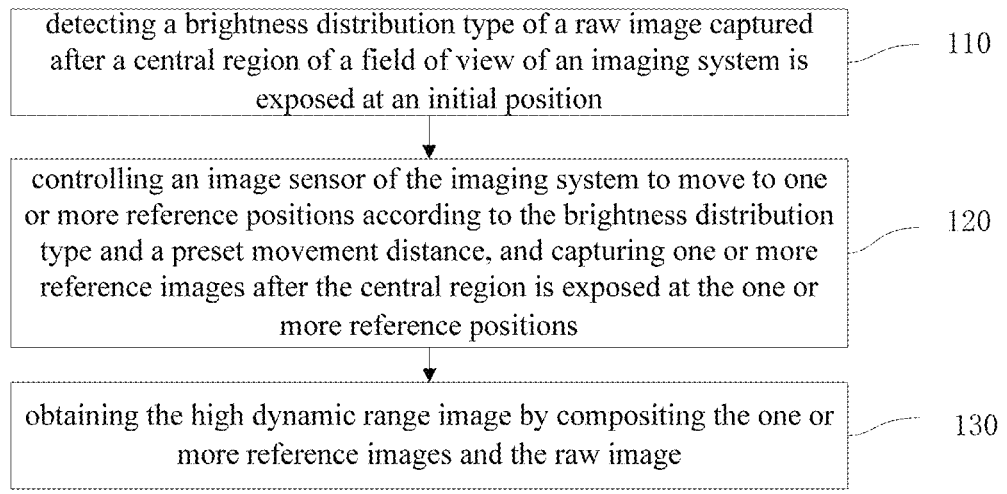
FIG. 1 is a flow chart illustrating a method for capturing a high dynamic range image according to an embodiment of the present disclosure.

Descriptions will be made in detail to embodiments of the present disclosure and examples of the embodiments are illustrated in drawings. The same or similar elements and the elements having same or similar functions are denoted by like reference numerals throughout the descriptions. The embodiments described herein with reference to drawings are explanatory, are used to understand the present disclosure, and are not be construed to limit the present disclosure.

In related art, when capturing a high dynamic range image, images of three exposure intensities (low exposure, medium exposure, high exposure) at a same position are captured, and the three images are composited into one image. The medium exposure may be accurately controlled. However, it is unable to accurately control the low exposure or the high exposure, and exposure control may be performed only based on a fixed duration. As a result, it is possible to cause that the shadow region in a generated high dynamic range image is still underexposed, and the high-light regions is overexposed continuously. A quality of the composited high dynamic range image is not high.

Therefore, embodiments of the present disclosure provide a method for capturing a high dynamic range image, a device for capturing a high dynamic range image, an electronic device and a non-transitory computer storage medium.

The method for capturing a high dynamic range image includes: detecting a brightness distribution type of a raw image captured after a central region of a field of view of an imaging system is exposed at an initial position; controlling an image sensor of the imaging system to move to one or more reference positions according to the brightness distribution type and a preset movement distance, and capturing one or more reference images after the central region is exposed at the one or more reference positions; and obtaining the high dynamic range image by compositing the one or more reference images and the raw image.

The device for capturing a high dynamic range image includes a processor and a memory configured to store instructions executable by the processor. The processor is configured to: detect a brightness distribution type of a raw image captured after a central region of a field of view of an imaging system is exposed at an initial position; control an image sensor of imaging system to move to one or more reference positions according to the brightness distribution type and a preset movement distance; capture one or more reference images after the central region is exposed at the one or more reference positions; and obtain the high dynamic range image by compositing the one or more reference images and the raw image.

The electronic device includes a housing, an imaging system having an image sensor, a memory and a processor. The imaging system, the memory and the processor are arranged in the housing. The processor is configured to run programs corresponding to executable program codes by reading the executable program codes stored in the memory, to: detect a brightness distribution type of a raw image captured after a central region of a field of view of the imaging system is exposed at an initial position; control the image sensor to move to one or more reference positions according to the brightness distribution type and a preset movement distance, and capture one or more reference images after the central region is exposed at the one or more reference positions; and obtain the high dynamic range image by compositing the one or more reference images and the raw image.

The non-transitory computer storage medium has one or more programs stored thereon. When the one or more programs are executed by a device, the device is configured to: detect a brightness distribution type of a raw image captured after a central region of a field of view of an imaging system is exposed at an initial position; control an image sensor of the imaging system to move to one or more reference positions according to the brightness distribution type and a preset movement distance, and capture one or more reference images after the central region is exposed at the one or more reference positions; and obtain the high dynamic range image by compositing the one or more reference images and the raw image.

A method and a device for capturing a high dynamic range image and an electronic device according to embodiments of the present disclosure will be described with reference to following drawings.

FIG. 1 is a flow chart illustrating a method for capturing a high dynamic range image according to an embodiment of the present disclosure.

As illustrated in FIG. 1, the method for capturing a high dynamic range image may include the followings.

In block 110, a brightness distribution type of a raw image is detected, in which the raw image is captured after a central region of a field of view of an imaging system is exposed at an initial position.

Generally, when a high dynamic range image is captured, images having three exposure intensities (low exposure, middle exposure, and high exposure) may be obtained at a same position by adjusting size of a diaphragm and a speed of shutter. The images having the three exposure intensities are composited to generate the high dynamic range image.

However, due to brightness of capturing environment and complexity of operations, it is possible that controls of the high exposure and the low exposure are inaccurate when photographing an object. Therefore, a shadow region is still underexposed, while a high-light region is continuously overexposed in the composited high dynamic range image. As a result, the composited high dynamic range image has a poor quality.

In order to solve the above problem and to improve the image quality, with the method for capturing a high dynamic range image according to embodiments of the present disclosure, it is required to detect a brightness distribution condition in the raw image captured, such that reference images having different exposure intensities are captured for regions having different brightness. The reference images are composited into the high dynamic range image.

Therefore, the reference images used for obtaining a composited high dynamic range image are exposed differently according to different brightness of a photographed object. Different reference images are obtained by clearly exposing regions with different brightness of the raw image. Further, by compositing the reference images into the high dynamic range image, each detail of the photographed object may be clearly presented, and the image quality is high.

Figure 2:
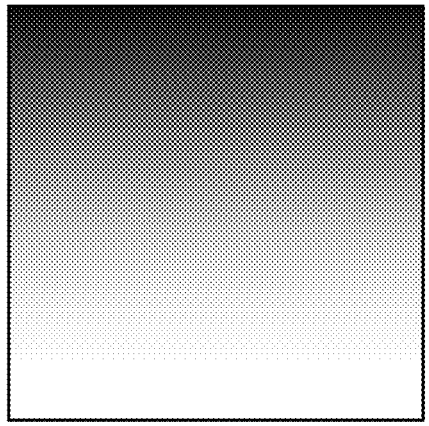
FIG. 2 is a schematic diagram illustrating a brightness distribution of a raw image according to an embodiment of the present disclosure.
Figure 3:
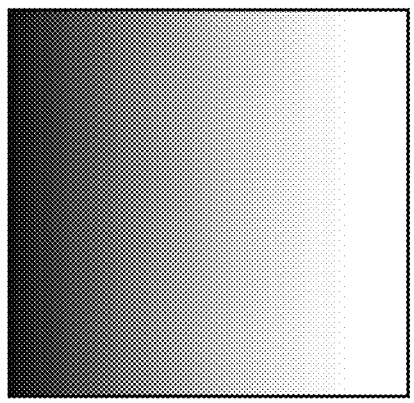
FIG. 3 is a schematic diagram illustrating another brightness distribution of a raw image according to an embodiment of the present disclosure.

In detail, in practical implementations, the brightness distribution type of the raw image is detected, in which the raw image is captured after the central region of the field of view of the imaging system is exposed at the initial position. For example, it is determined whether the brightness distribution type of the raw image is a horizontal distribution illustrated in FIG. 2, i.e., the brightness level of the raw image on a same horizontal line is constant or a vertical distribution illustrated in FIG. 3, i.e., the brightness level of the raw image on a same vertical line is constant.

It should be explained that, the brightness distribution type of the raw image may be determined in various manners according to different specific application scenarios, in which the raw image is captured after the central region of the field of view of the imaging system is exposed at the initial position.

In an embodiment of the present disclosure, it may be detected whether a first difference between a pixel brightness of an upper half of the raw image and a pixel brightness of a lower half of the raw image satisfies a preset threshold. The preset threshold is a pixel difference calibrated based on a large amount of experiments. Whether a deviation between the pixel brightness is significant may be determined according to the difference.

In some embodiments of the present disclosure, the pixel brightness of the upper half of the raw image may be an average pixel brightness of pixels of the upper half of the raw image. The pixel brightness of the lower half of the raw image may be an average pixel brightness of pixels of the lower half of the raw image.

Further, when the first difference satisfies the preset threshold, it is indicated that the deviation between the pixel brightness of the upper half of the raw image and the pixel brightness of the lower half of the raw image is significant, thereby determining that the brightness distribution type of the raw image is the horizontal distribution.

When the first difference does not satisfy the preset threshold, it is indicated that the pixel brightness of the upper half of the raw image is relatively identical to the pixel brightness of the lower half of the raw image, and the deviation is not significant. It is thus detected whether a second difference between a pixel brightness of a left half of the raw image and a pixel brightness of a right half of the raw image satisfies the preset threshold.

In some embodiments of the present disclosure, the pixel brightness of the left half of the raw image may be an average pixel brightness of pixels of the left half of the raw image. The pixel brightness of the right half of the raw image may be an average pixel brightness of pixels of the right half of the raw image.

When the second difference satisfies the preset threshold, it is indicated that a deviation between the pixel brightness of the left half of the raw image and the pixel brightness of the right half of the raw image is significant, thereby determining that the brightness distribution type of the raw image is the vertical distribution.

In block 120, an image sensor of the imaging system is controlled to move to one or more reference positions according to the brightness distribution type and a preset movement distance, and one or more reference images are captured after the central region is exposed at the one or more reference positions.

In an embodiment, in order to capture different reference images for different brightness of the raw image, after the brightness distribution type of the raw image is determined, a micro-electro-mechanical system may be triggered to move the image sensor to the one or more reference positions according to the brightness distribution type and the preset movement distance, and the one or more reference images are captured after the central region is exposed at the one or more reference positions.

Specifically, the micro-electro-mechanical system is a high tech electronic mechanical device developed on the basis of microelectronic technology (semiconductor manufacturing technology), combining with lithography, etching, thin film, LIGA (Germany: lithographie, galvanoformung and abformung), silicon micromachining, non-silicon micromachining and precision machining technologies.

Figure 4:
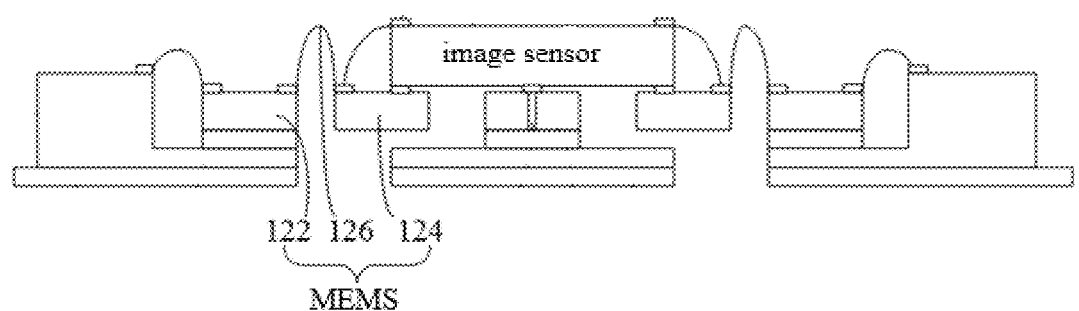
FIG. 4 is a block diagram illustrating a micro-electro-mechanical system according to an embodiment of the present disclosure.

As illustrated in FIG. 4, the micro-electro-mechanical system includes a fixed electrode 122, a moveable electrode 124 and a deformable connector 126. The moveable electrode 124 is cooperated with the fixed electrode 122. The connector 126 is fixedly connected to the fixed electrode 122 and the moveable electrode 124. The fixed electrode 122 and the moveable electrode 124 are configured to generate an electrostatic force under action of a driving voltage. The connector 126 is configured to deform along a movement direction of the moveable electrode 124 under action of the electrostatic force, to allow the moveable electrode 124 to move, thereby driving the image sensor to move.

Figure 5:
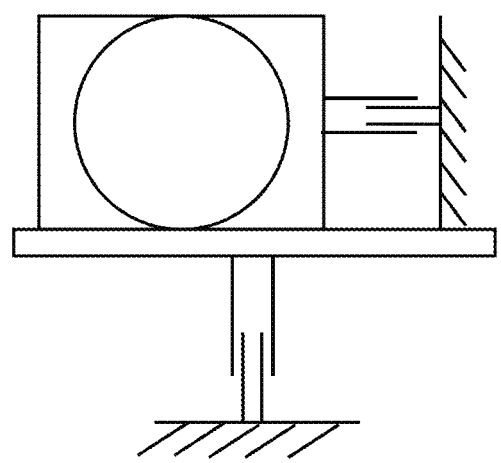
FIG. 5 is a schematic diagram illustrating a connection between a micro-electro-mechanical system and an image sensor according to an embodiment of the present disclosure.

It should be explained that, according to different specific application requirements, different movement directions of the image sensor controlled by the micro-electro-mechanical system are set correspondingly. That is, as illustrated in FIG. 5, micro-electro-mechanical systems may be set along a horizontal direction and along a vertical direction of the image sensor, such that the micro-electro-mechanical systems may drive the image sensor to move leftwards or rightwards horizontally, or to move upwards or downwards horizontally. A step length of each movement of the image sensor controlled by the micro-electro-mechanical systems may be determined through calibration by the system based on a large amount of experimental data, or may be set by the user based on requirements.

In order to describe clearly how the micro-electro-mechanical system controls the image sensor to move according to the brightness distribution type and the movement distance, following examples are used for illustration.

A first example is described. When the brightness distribution type of the raw image is the horizontal distribution, a first micro-electro-mechanical system is triggered to move the image sensor to the one or more reference positions along a positive direction or a negative direction of the vertical direction based on a preset movement distance.

Figure 6:
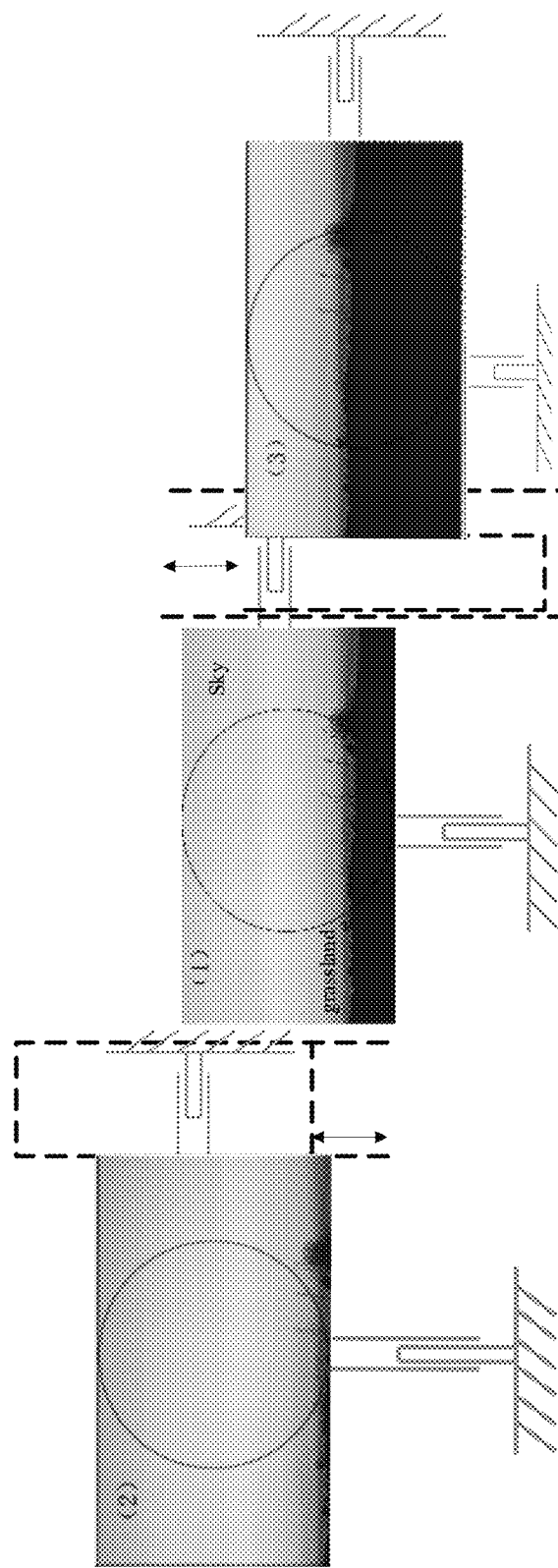
FIG. 6 is a schematic diagram illustrating an application that a micro-electro-mechanical system controls an image sensor for photographing according to an embodiment of the present disclosure.

In this example, illustrated as a raw image (1) of FIG. 6, when the raw image of a scene is captured, the difference between brightness of sky at the upper of the raw image and brightness of grassland at the lower of the raw image is significant, since a region containing the sky is bright while a region containing the grassland is dark. As a result, in the raw image, the sky may be overexposed and the grassland may be underexposed.

Consequently, as illustrated in a reference image (2) of FIG. 6, the image sensor moves to a reference position along the positive direction of the vertical direction, to obtain a reference image. In the obtained reference image, the sky is properly exposed, such that the obtained reference image clearly presents details of the sky.

In an embodiment, as illustrated in a reference image (3) of FIG. 6, the image sensor moves to a reference position along the negative direction of the vertical direction, to obtain a reference image. In the obtained reference image, the grassland is properly exposed, such that the obtained reference image clearly presents details of the grassland.

A second example is described. When the brightness distribution type of the raw image is the vertical distribution, a second micro-electro-mechanical system is triggered to move the image sensor to one or more reference positions along a position direction or a negative direction of a horizontal direction based on a preset movement distance.

Figure 7:
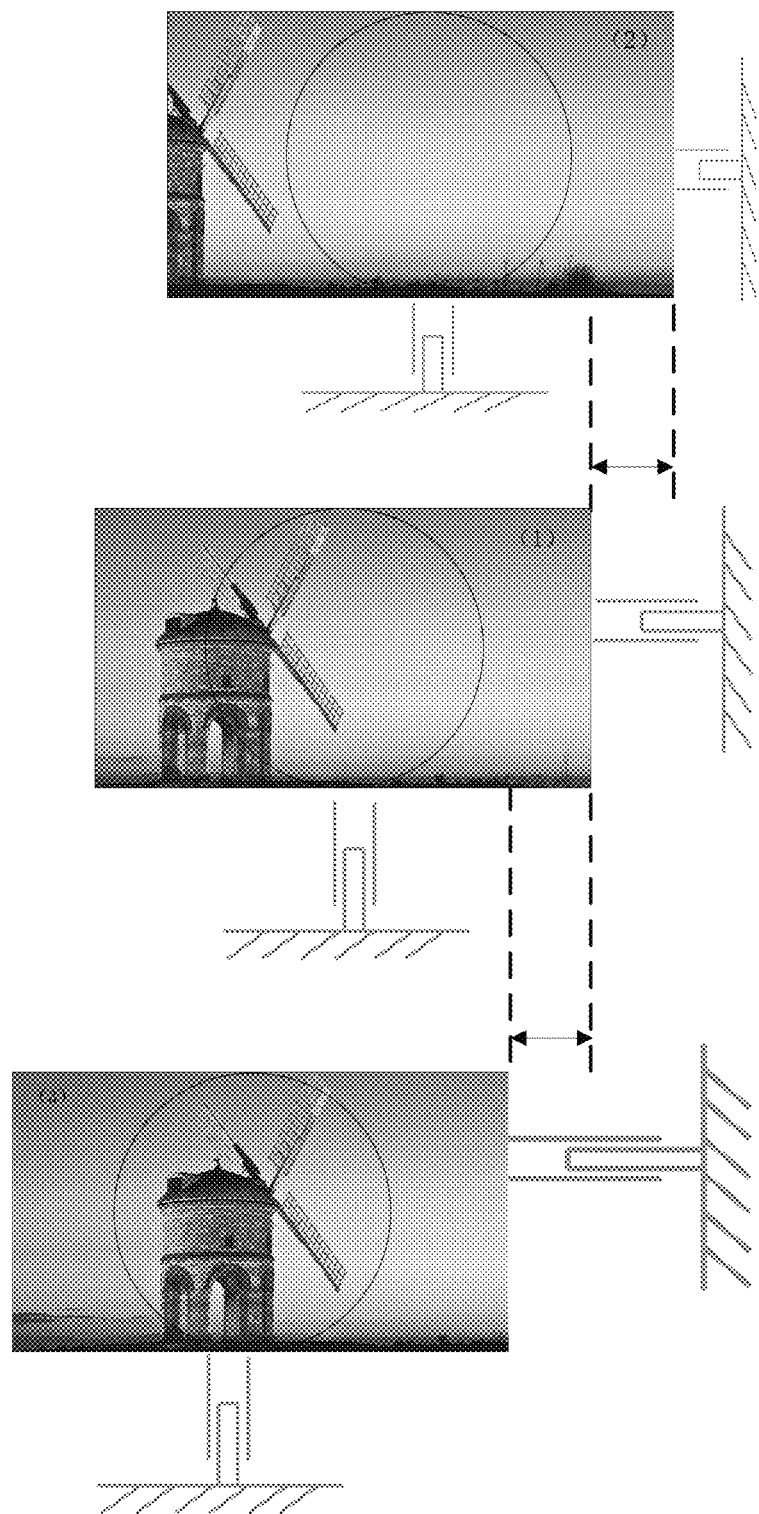
FIG. 7 is a schematic diagram illustrating another application that a micro-electro-mechanical system controls an image sensor for photographing according to an embodiment of the present disclosure.

In this example, as illustrated in a raw image (1) of FIG. 7, when the raw image of a scene is captured, the difference between brightness of a windmill at the left of the raw image and brightness of sky at the right of the raw image is significant, since a region containing the sky is bright while a region containing the windmill is dark. As a result, in the raw image, the sky may be overexposed, and the windmill may be underexposed.

Consequently, as illustrated in a reference image (2) of FIG. 7, the image sensor moves to a reference position along the positive direction of the horizontal direction, to obtain a reference image. In the obtained reference image, the sky is properly exposed, such that the obtained reference image clearly presents details of the sky.

In an embodiment, as illustrated in a reference image (3) of FIG. 7, the image sensor moves to a reference position along the negative direction of the horizontal direction, to obtain a reference image. In the obtained reference image, the windmill is properly exposed, such that the obtained reference image clearly present details of the windmill.

In block 130, the high dynamic range image is obtained by compositing the one or more reference images and the raw image.

Specifically, the one or more reference images and the raw image are composited, to eliminate overexposure and underexposure of the raw image, such that the obtained high dynamic range image clearly presents each detail of the photographed object. The image effect presented is close to a vision effect of human eyes, such that the image quality of the obtained high dynamic range image is improved.

Figure 8:
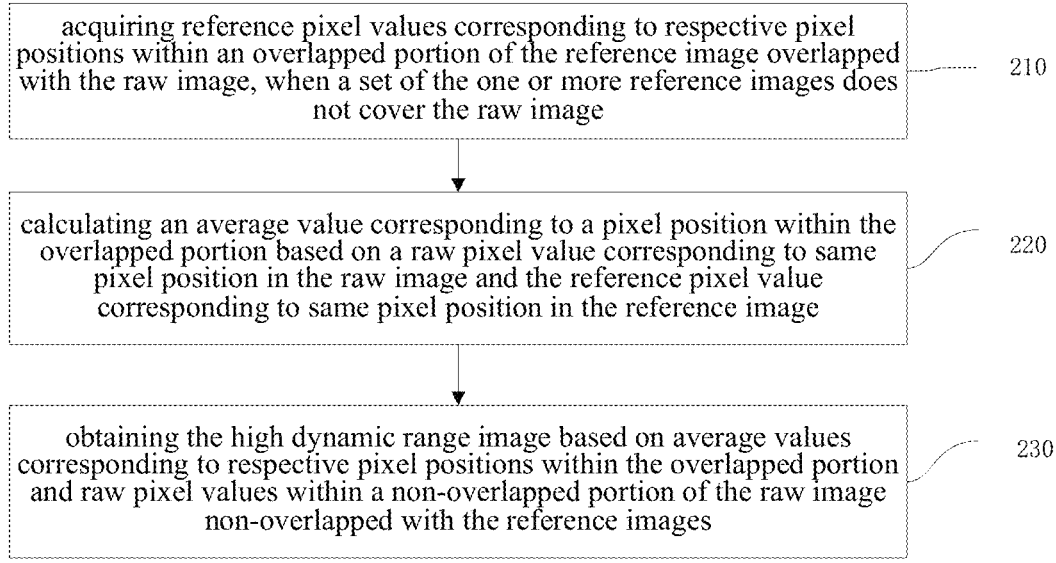
FIG. 8 is a flow chart illustrating a method for capturing a high dynamic range image according to another embodiment of the present disclosure.
Figure 9:
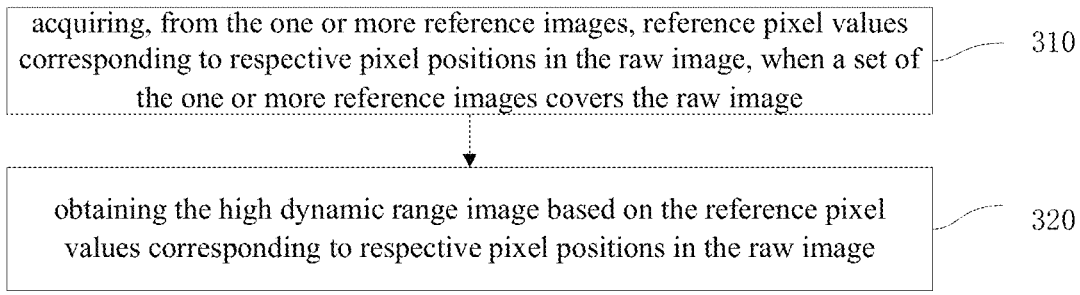
FIG. 9 is a flow chart illustrating a method for capturing a high dynamic range image according to still another embodiment of the present disclosure.

It should be explained that, the high dynamic range image may be obtained by compositing the one or more reference images and the raw image in various processing manners according to different specific application requirements, which may be illustrated in combination with FIGS. 8 and 9.

FIG. 8 is a flow chart illustrating a method for capturing a high dynamic range image according to another embodiment of the present disclosure. As illustrated in FIG. 8, the block 130 may include the following.

In block 210, when a set of the one or more reference images does not cover the raw image, reference pixel values corresponding to respective pixel positions within an overlapped portion of the reference image overlapped with the raw image are acquired.

In detail, when the set of the reference images only contains a part of raw image, instead of covering the raw image, the reference pixel values corresponding to respective pixel positions within the overlapped portion of the reference image overlapped with the raw image may be acquired.

In some embodiments, determining whether the set of reference images covers the raw image may be performed through image recognition. For example, by recognizing the raw image and the reference images, it may be determined whether the set of reference images covers the raw image.

For example, when the one or more reference images of the raw image, for example, the raw image (1) illustrated in FIG. 6, only include the reference image (2) illustrated in FIG. 6, the reference image (2) does not completely present related portions to the grassland, and thus does not cover the raw image (1). Therefore, reference pixel values corresponding to respective pixel positions of the sky and reference pixel values corresponding to respective pixel positions of a small portion of the grassland within the overlapped region of the reference image (2) overlapped with the raw image (1) are acquired.

In some embodiments, when the one or more reference images of the raw image includes two or more reference images, but the two or more reference images do not cover the raw image, reference pixel values corresponding to respective pixel positions are acquired based on the two or more reference images.

In block 220, an average value corresponding to a pixel position within the overlapped portion is calculated based on a raw pixel value corresponding to same pixel position in the raw image and the reference pixel value corresponding to same pixel position in the reference image.

For example, within the overlapped portion between the reference image and the raw image, the raw pixel value corresponding to the same pixel position is acquired from the raw image and the reference pixel value corresponding to the same pixel position is acquired from the reference image. When the overlapped portion between the raw image and the reference image is an image of the sky, the raw pixel value corresponding to the same pixel position within the image of the sky is acquired from the raw image and the reference pixel value corresponding to the same pixel position within the image of the sky is acquired from the reference image. The raw pixel value and the reference pixel value are averaged.

In some embodiments, the one or more reference images of the raw image include two or more reference images. The two or more reference images do not cover the raw image. An average value corresponding to a pixel position within the overlapped portion among the raw image and the two or more reference images is calculated based on a raw pixel value corresponding to the same pixel position in the raw image and based on the reference pixel values corresponding to the same pixel position in the two or more reference images respectively.

For example, there are two reference images and the two reference images do not cover the raw image. A pixel position A1 is within an overlapped region among the raw image and the two reference images. A pixel position A2 is within an overlapped region between the raw image and a first reference image, but not within the overlapped region among the raw image and the two reference images. A pixel position A3 is within an overlapped region between the raw image and a second reference image, but not within the overlapped region among the raw image and the two reference images. A pixel position A4 is within the raw image, but not within the above three overlapped region. A pixel value corresponding to the pixel position A1 is calculated based on the raw pixel value corresponding to the pixel position A1 in the raw image, a first reference pixel value of the pixel position A1 in the first reference image and a second reference pixel value corresponding to the pixel position A1 in the second reference image. A pixel value corresponding to the pixel position A2 is calculated based on the raw pixel value corresponding to the pixel position A2 in the raw image and the first reference pixel value corresponding to the pixel position A2 in the first reference image. A pixel value corresponding to the pixel position A2 is calculated based on the raw pixel value corresponding to the pixel position A3 in the raw image and the second reference pixel value corresponding to the pixel position A3 in the second reference image. A pixel value corresponding to the pixel position A4 is obtained from the raw image.

Specifically, the calculations of the pixel value corresponding to the pixel position A1, the pixel value corresponding to the pixel position A2, and the pixel value corresponding to the pixel position A3 may be an average operation. In other words, the pixel value corresponding to the pixel position A1 may be calculated by averaging the raw pixel value corresponding to the pixel position A1 in the raw image, the first reference pixel value of the pixel position A1 in the first reference image and the second reference pixel value corresponding to the pixel position A1 in the second reference image. The pixel value corresponding to the pixel position A2 may be calculated by averaging the raw pixel value corresponding to the pixel position A2 in the raw image and the first reference pixel value corresponding to the pixel position A2 in the first reference image. The pixel value corresponding to the pixel position A2 may be calculated by averaging the raw pixel value corresponding to the pixel position A3 in the raw image and the second reference pixel value corresponding to the pixel position A3 in the second reference image. The pixel value corresponding to the pixel position A4 may be the raw pixel value corresponding to the pixel position A4 in the raw image.

In block 230, according to the average value corresponding to respective pixel positions within the overlapped portion and raw pixel values with a non-overlapped portion of the raw image non-overlapped with the reference images, the high dynamic range image is obtained through a composition process.

In detail, after the average value corresponding to respective pixel positions within the overlapped portion between the raw image and the reference images is obtained, the composition process is performed on the raw image. That is, the average value is assigned to a corresponding pixel position of the raw image, but the raw pixel value corresponding to respective pixel positions within the non-overlapped portion of the raw image non-overlapped with the reference images is not changed, to generate the composited high dynamic range image, which may clearly present details of each region of the photographed object.

FIG. 9 is a flow chart illustrating a method for capturing a high dynamic range image according to still another embodiment of the present disclosure. As illustrated in FIG. 9, the block 130 may include the following.

In block 310, when the set of one or more reference images covers the raw image, reference pixel values corresponding to respective pixel positions in the raw image are acquired from the one or more reference images.

In detail, when the set of the one or more reference images contains the whole raw image, i.e., covering the raw image, the reference pixel values corresponding to respective pixel positions in the raw image may be acquired from the one or more reference images.

For example, when the one or more reference images of the raw image illustrated as the raw image (1) of FIG. 6 include the reference images (2) and (3) of FIG. 6, the reference images (2) and (3) present completely the related images to the grassland and the sky included in the raw image (1), i.e. including the whole raw image, illustrated as the raw image (1), such that the reference pixel values corresponding to respective pixel positions of the sky in the raw image (1) are acquired from the reference image (2) and the reference pixel values corresponding to respective pixel positions of the grassland in the raw image (1) are acquired from the reference image (3).

In block 320, the high dynamic range image is obtained by compositing the reference pixel values corresponding to respective pixel position in the raw image.

In detail, after the reference pixel value of the reference image corresponding to respective pixel positions in the raw image are acquired, a corresponding operation process is performed on a raw pixel value of the raw image and corresponding reference pixel values. For example, the raw pixel value and the corresponding reference pixel values are averaged to obtain a pixel average value, and the obtained pixel average value is assigned to a pixel value at the same pixel position corresponding to the raw pixel to obtain the high dynamic range image. The high dynamic range image may clearly present details of each region of the photographed object.

In conclusion, with the method for capturing a high dynamic range image according to embodiments of the present disclosure, the brightness distribution type of the raw image is detected, in which the raw image is captured after the central region of the field of view of the imaging system is exposed at the initial position. The image sensor is controlled to move to the one or more reference positions based on the brightness distribution type and the preset movement distance. The one or more reference images are captured after the central region is exposed at the reference positions. The high dynamic range image is obtained by compositing the reference images and the raw image. Therefore, it is realized that the composited high dynamic range image is close to the vision effect of human eyes, thereby improving a quality of the high dynamic range image.

On the basis of above embodiments, it should be understood that, in practical applications, for better taking advantage of resolution of the image sensor such that the quality of the obtained high dynamic range image is high, after the brightness distribution type of the raw image is detected, in which the raw image is captured after the central region of the field of view of the imaging system is exposed at the initial position, the micro electro-mechanical system may be triggered according to a preset control strategy and the movement distance. In addition, a movement distance of the image sensor may be determined according to a resolution distribution condition of the image sensor.

Figure 10:
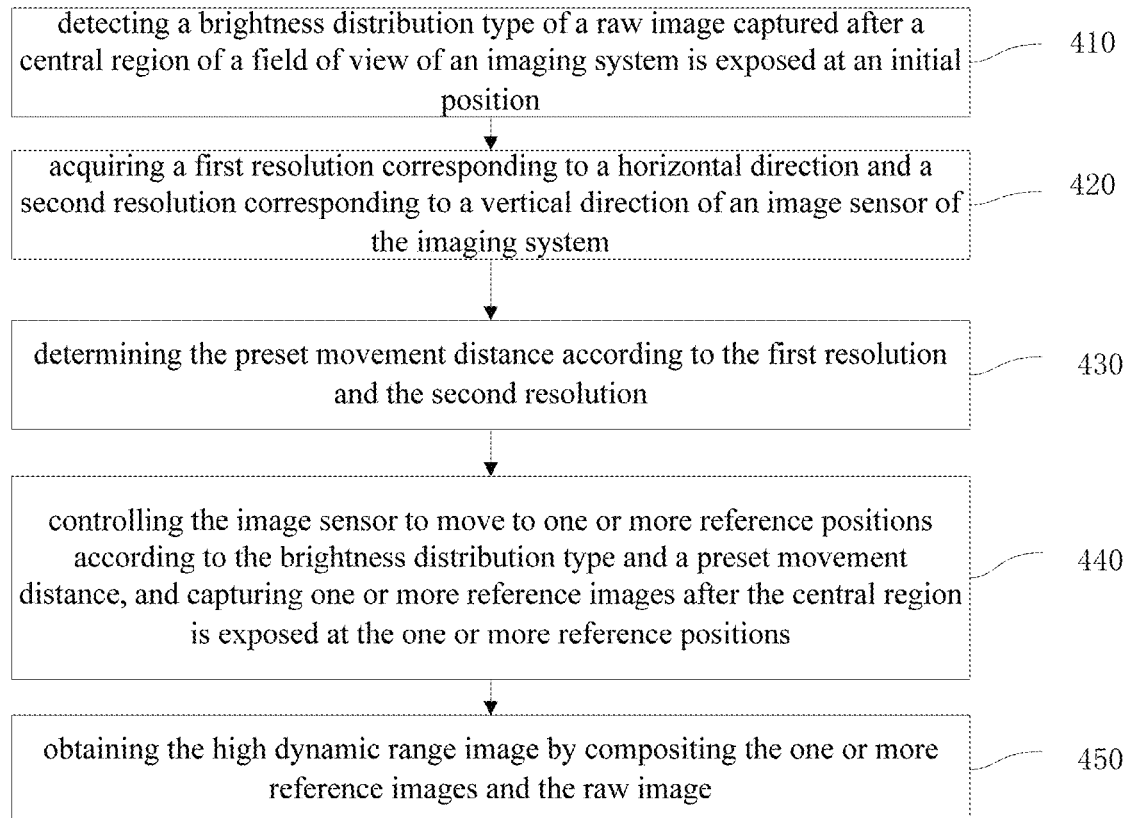
FIG. 10 is a flow chart illustrating a method for capturing a high dynamic range image according to yet another embodiment of the present disclosure.

Specifically, FIG. 10 is a flow chart illustrating a method for capturing a high dynamic range image according to yet another embodiment of the present disclosure. As illustrated in FIG. 10, the method includes the following.

In block 410, the brightness distribution type of the raw image is detected, in which the raw image is captured after the central region of the field of view of an imaging system is exposed at the initial position.

Specifically, the brightness distribution type of the raw image may be detected according to the distribution condition of the pixel brightness of the raw image captured after the central region of the field of view of the imaging system is exposed at the initial position.

In block 420, a first resolution corresponding to a horizontal direction and a second resolution corresponding to a vertical direction of the image sensor are acquired.

In block 430, the movement distance is determined according to the first resolution and the second resolution.

Specifically, after the brightness distribution type of the raw image is detected, in order to make the captured reference image to be properly exposed for various brightness, it is required to set a proper movement distance when the image sensor moves.

Specifically speaking, according to different specific application scenarios, the proper movement distance may be determined in various manners when the image sensor moves.

In an embodiment of the present disclosure, the first resolution corresponding to the horizontal direction and the second resolution corresponding to the vertical direction of the image sensor may be acquired. An operation process is performed on the first resolution and the second resolution to determine the movement distance of the image sensor when the image sensor moves.

In embodiments, the acquired first resolution along the horizontal direction of the image sensor is w, and the acquired second resolution along the vertical direction of the image sensor is h, where w is greater than or equal to h. When the brightness distribution type of the raw image is the horizontal distribution, a value of h/4, i.e., a quarter value of the second resolution, may be determined as the movement distance corresponding to the vertical movement of the image sensor.

When the brightness distribution type of the raw image is the vertical distribution, a value of w/4, i.e., a quarter value of the second resolution, may be determined as the movement distance corresponding to the horizontal direction of the image sensor.

In block 440, the image sensor is controlled to move to one or more reference positions according to the brightness distribution type and a preset movement distance, and the one or more reference images are captured after the central region is exposed at the one or more reference positions.

In at least one embodiment, a micro-electro-mechanical system may be triggered to move the image sensor.

In block 450, the high dynamic range image is acquired by compositing the one or more reference images and the raw image.

Specific implementations of blocks 450 and 460 in embodiments may be referred to implementations of blocks 120 and 130 in above embodiments, which are not elaborated herein.

In conclusion, with the method for capturing a high dynamic range image according to embodiments of the present disclosure, the first resolution corresponding to the horizontal direction and the second resolution corresponding to the vertical direction of the image sensor are acquired, and the movement distance is determined according to the first resolution and the second resolution. Therefore, when the brightness distribution type of the raw image is detected, the micro-electro-mechanical system may move the image sensor according to a more proper movement distance, such that the captured reference image clearly presents image details within regions having different brightness of the raw image, thereby effectively improving the quality of the composited high dynamic range image.

Figure 11:
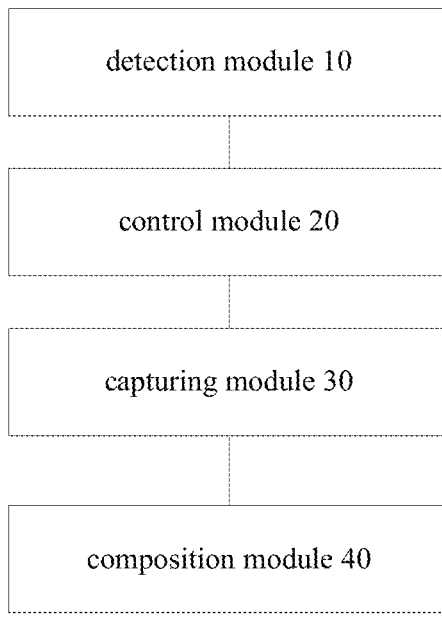
FIG. 11 is a block diagram illustrating a device for capturing a high dynamic range image according to an embodiment of the present disclosure.

In order to implement the above embodiments, the present disclosure further provides a device for capturing a high dynamic range image. FIG. 11 is a block diagram illustrating a device for capturing a high dynamic range image according to an embodiment of the present disclosure. As illustrated in FIG. 11, the device for capturing a high dynamic range image includes a detection module 10, a control module 20, a capturing module 30 and a composition module 40.

The detection module 10 is configured to detect a brightness distribution type of a raw image captured after a central region of a field of view of an imaging system is exposed at an initial position.

The control module 20 is configured to control an image sensor of the imaging system to move to one or more reference positions according to the brightness distribution type and the preset movement distance. In at least one embodiment, a micro-electro-mechanical system may be triggered to move the image sensor.

The capturing module 30 is configured to capture one or more reference images after the central region of the field view of the imaging system is exposed at the one or more reference positions.

The composition module 40 is configured to obtain a high dynamic range image by compositing the one or more reference images and the raw image.

Figure 12:
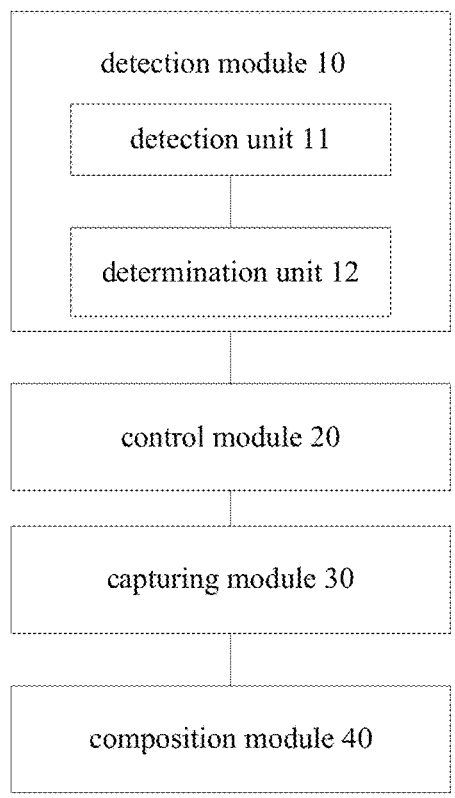
FIG. 12 is a block diagram illustrating a device for capturing a high dynamic range image according to another embodiment of the present disclosure.

FIG. 12 is a block diagram illustrating a device for capturing a high dynamic range image according to another embodiment of the present disclosure. As illustrated in FIG. 12, the detection module 10 may include a detection unit 11 and a determination unit 12.

The detection unit 11 is configured to detect whether a first difference between a pixel brightness of an upper half of the raw image and a pixel brightness of a lower half of the raw image satisfies a preset threshold.

The determination unit 12 is configured to determine that the brightness distribution type of the raw image is a horizontal distribution when the first difference satisfies the preset threshold.

The detection unit 11 is further configured to detect whether a second difference between a pixel brightness of a left half of the raw image and a pixel brightness of a right half of the raw image satisfies the preset threshold when the first difference does not satisfies the preset threshold.

The determination unit 12 is further configured to determine that the brightness distribution type of the raw image is a vertical distribution when the second difference satisfies the preset threshold.

In detail, the control module 20 is configured to control the image sensor to move to the one or more reference positions along a positive direction or a negative direction of the vertical direction based on the preset movement distance, when the brightness distribution type of the raw image is the horizontal distribution. In at least one embodiment, the micro-electro-mechanical system may include a first micro-electro-mechanical system. The first micro-electro-mechanical system may be triggered to move the image sensor when the brightness distribution type of the raw image is the horizontal distribution.

In an embodiment, the control module 20 is configured to control the image sensor to move to one or more reference positions along a positive direction or a negative direction of the horizontal direction according to the preset movement distance, when the brightness distribution type of the raw image is the vertical distribution. In at least one embodiment, the micro-electro-mechanical system may include a second micro-electro-mechanical system. The second micro-electro-mechanical system may be triggered to move the image sensor when the brightness distribution type of the raw image is the vertical distribution.

Figure 13:
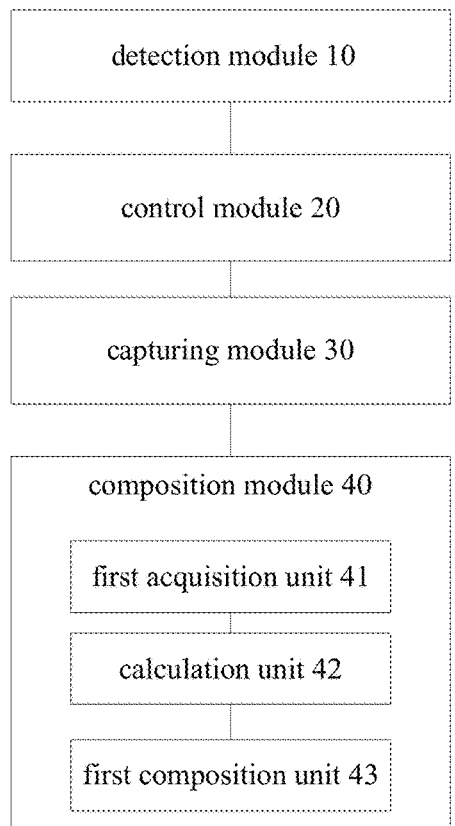
FIG. 13 is a block diagram illustrating a device for capturing a high dynamic range image according to still another embodiment of the present disclosure.

FIG. 13 is a block diagram illustrating a device for capturing a high dynamic range image according to still another embodiment of the present disclosure. As illustrated in FIG. 13, on the basis of FIG. 11, the composition module 40 may include a first acquisition unit 41, a calculation unit 42 and a first composition unit 43.

The first acquisition unit 41 is configured to acquire reference pixel values corresponding to respective pixel positions within an overlapped portion of the reference images overlapped with the raw image, when a set of the one or more reference images does not cover the raw image.

The calculation unit 42 is configured to calculate an average value corresponding to a pixel position within the overlapped portion according to a raw pixel value corresponding to same pixel position in the raw image and a reference pixel value corresponding to same pixel position in the reference image.

The first composition unit 43 is configured to obtain the high dynamic range image according to the average value corresponding to respective pixel positions within the overlapped portion and raw pixel values within a non-overlapped portion of the raw image non-overlapped with the reference images.

Figure 14:
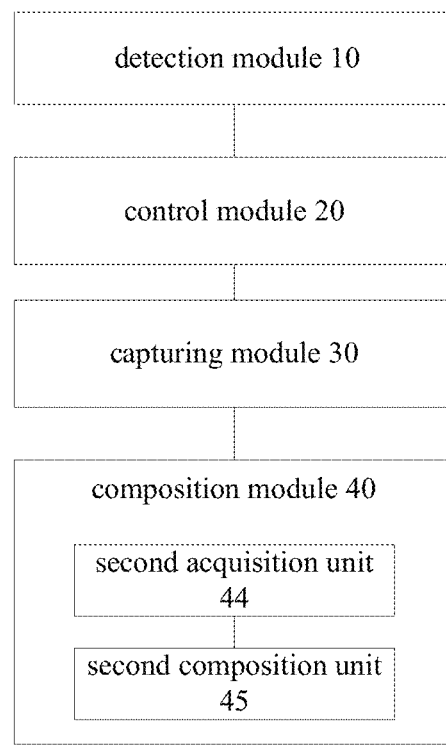
FIG. 14 is a block diagram illustrating a device for capturing a high dynamic range image according to yet another embodiment of the present disclosure.

FIG. 14 is a block diagram illustrating a device for capturing a high dynamic range image according to still another embodiment of the present disclosure. As illustrated in FIG. 14, on the basis of FIG. 11, the composition module 40 may further includes a second acquisition unit 44 and a second composition unit 45.

The second acquisition unit 44 is configured to acquire, from the one or more reference images, reference pixel values corresponding to respective pixel position in the raw image, when the set of the one or more reference images covers the raw image.

The second composition unit 45 is configured to obtain the high dynamic range image according to the reference pixel values corresponding to respective pixel positions in the raw image.

It should be explained that, descriptions made to embodiments of the above method for capturing a high dynamic range image is also applicable to embodiments of the device for capturing a high dynamic range image in embodiments of the present disclosure, and implementation principles thereof are similar, which are not elaborated herein.

In conclusion, with the device for capturing a high dynamic range image according to embodiments of the present disclosure, the brightness distribution type of the raw image is detected, in which the raw image is captured after the central region of the field of view of the imaging system is exposed at the initial position. The image sensor is controlled to move to one or more reference positions based on the brightness distribution type and the preset movement distance. The one or more reference images are captured at the one or more reference positions after the central region is exposed. The high dynamic range image is obtained by compositing the one or more reference images and the raw image. Therefore, it is realized that the composited high dynamic range image is close to a vision effect of human eyes, thereby improving a quality of the high dynamic range image.

Figure 15:
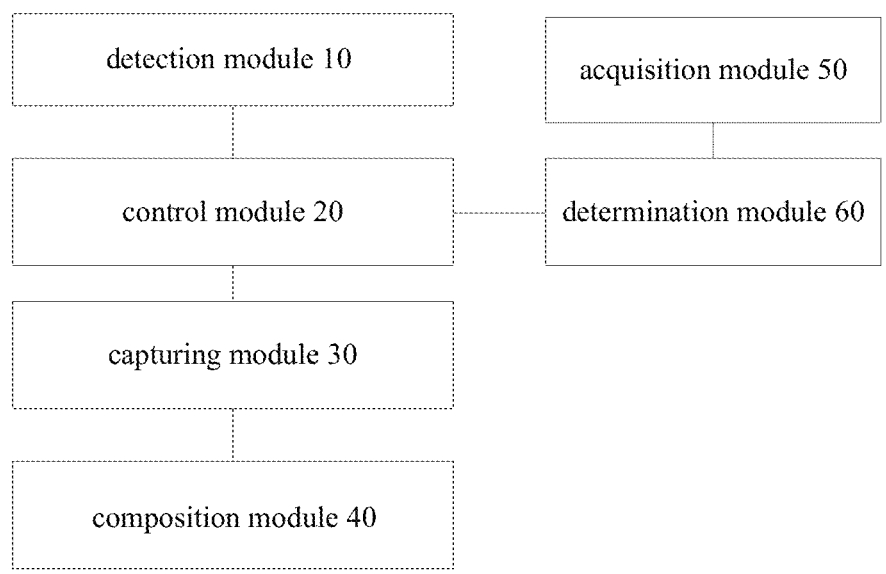
FIG. 15 is a block diagram illustrating a device for capturing a high dynamic range image according to yet another embodiment of the present disclosure.

FIG. 15 is a block diagram illustrating a device for capturing a high dynamic range image according to yet another embodiment of the present disclosure. As illustrated in FIG. 15, on the basis of FIG. 11, the device for capturing a high dynamic range image may further include an acquisition module 50 and a determination module 60.

The determination module 60 is configured to determine a movement distance according to a first resolution and a second resolution.

It should be explained that, descriptions made to embodiments of the above method for capturing a high dynamic range image is also applicable to embodiments of the device for capturing a high dynamic range image in embodiments of the present disclosure, and implementation principles thereof are similar, which are not elaborated herein.

In conclusion, with the device for capturing a high dynamic range image according to embodiments of the present disclosure, the first resolution corresponding to the horizontal direction and the second resolution corresponding to the vertical direction of the image sensor are acquired. The movement distance is determined according to the first resolution and the second resolution. Therefore, when the brightness distribution type of the raw image is acquired, the micro-electro-mechanical may move the image sensor based on a proper movement distance, such that the captured reference image may clearly present details of regions having different brightness of the raw image, thereby efficiently improving the quality of the composited high dynamic range image.

Figure 16:
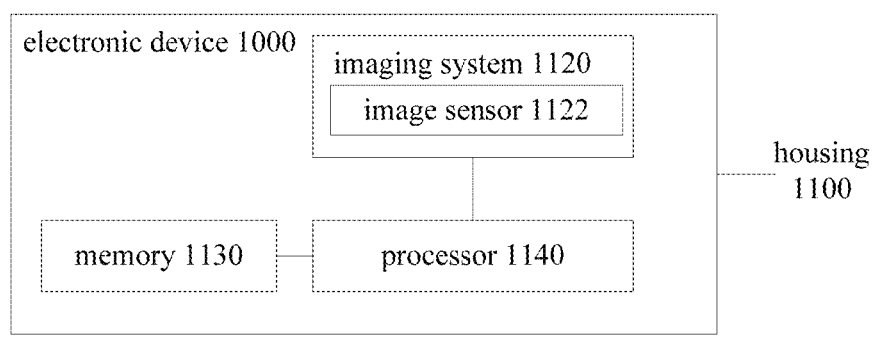
FIG. 16 is a block diagram illustrating an electronic device according to an embodiment of the present disclosure.

In order to implement the above embodiments, the present disclosure further provides an electronic device. FIG. 16 is a block diagram illustrating an electronic device according to an embodiment of the present disclosure. As illustrated in FIG. 16, the electronic device 1000 includes a housing 1100, an imaging system 1120 having an image sensor 1122, a memory 1130 and a processor 1140. The imaging system 1120, the memory 1130 and the processor 1140 are arranged inside the housing 1100. The processor 1140 is configured to run programs corresponding to executable program codes by reading the executable program codes stored in the memory 1130, to execute the followings.

A brightness distribution type of a raw image is detected, in which the raw image is captured after a central region of a field of view of the imaging system is exposed at an initial position.

The image sensor is controlled to move to one or more reference positions according to the brightness distribution type and a preset movement distance and one or more reference images are captured after the central region is exposed at the one or more reference positions.

A high dynamic range image is obtained by compositing the one or more reference images and the raw image.

In an embodiment, the electronic device further includes a micro-electro-mechanical system, arranged in the housing and configured to control a movement of the image sensor according to the brightness distribution type and the preset movement distance.

It should be explained that, descriptions made to embodiments of the above method for capturing a high dynamic range image is also applicable to embodiments of the device for capturing a high dynamic range image in embodiments of the present disclosure, and implementation principles thereof are similar, which are not elaborated herein.

In conclusion, with the electronic device according to embodiments of the present disclosure, the brightness distribution type of the raw image is detected, in which the raw image is captured after the central region of the field of view of the imaging system is exposed at the initial position. The image sensor is controlled to move to one or more reference positions based on the brightness distribution type and the preset movement distance. The one or more reference images are captured after the central region is exposed at the one or more reference positions. The high dynamic range image is obtained by compositing the one or more reference images and the raw image. Therefore, it is realized that the composited high dynamic range image is close to a vision effect of human eyes, thereby improving a quality of the high dynamic range image.

In the description of the present disclosure, reference throughout this specification to "an embodiment", "some embodiments", "a schematic example", "an example", "a specific example" or "some examples" means that a particular feature, structure, material, or characteristic described in connection with the implementation or example is included in at least one implementation or example of the present disclosure. In the specification, schematic expressions of the above terms are not necessarily referring to the same embodiment or example of the present disclosure. Furthermore, the particular features, structures, materials, or characteristics may be combined in any suitable manner in one or more implementations or examples. In addition, without a contradiction, the different embodiments or examples and the features of the different embodiments or examples described in the specification can be combined by those skilled in the art.

Although explanatory embodiments have been shown and described, it would be appreciated by those skilled in the art that the above embodiments are exemplary and cannot be construed to limit the present disclosure, and changes, modifications, alternatives, and variations can be made in the embodiments within the scope of the present disclosure.

What is claimed is:

1. A method for capturing a high dynamic range image, comprising:
   detecting a brightness distribution type of a raw image captured after a central region of a field of view of an imaging system is exposed at an initial position, including: detecting a first difference between a pixel brightness of an upper half of a raw image and a pixel brightness of a lower half of the raw image, detecting a second difference between a pixel brightness of a left half of the raw image and a pixel brightness of a right half of the raw image, and determining the brightness distribution type of the raw image based on the first difference and the second difference;
   triggering a micro-electro-mechanical system to move an image sensor of the imaging system to move to one or more reference positions according to the brightness distribution type and a preset movement distance, and capturing one or more reference images after the central region is exposed at the one or more reference positions;
   wherein triggering the micro-electro-mechanical system to move the image sensor of the imaging system to the one or more reference positions according to the brightness distribution type and the preset movement distance comprises: in response to detecting that the first difference satisfies a preset threshold, determining that the brightness distribution type of the raw image is the horizontal distribution and triggering a first micro-electro-mechanical system to move the image sensor to the one or more reference positions along a positive direction and/or a negative direction of a vertical direction based on the preset movement distance;
   in response to detecting that the first difference does not satisfy the preset threshold and the second difference satisfies the preset threshold, determining that the brightness distribution type of the raw image is the vertical distribution, and triggering a second micro-electro-mechanical system to move the image sensor to the one or more reference positions along a positive direction and/or a negative direction of a horizontal direction based on the preset movement distance; and
   obtaining the high dynamic range image by compositing the one or more reference images and the raw image.

2. The method according to claim 1, before triggering the micro-electro-mechanical system to move the image sensor of the imaging system to the one or more reference positions according to the brightness distribution type and the preset movement distance, further comprising:
   acquiring a first resolution corresponding to a horizontal direction and a second resolution corresponding to a vertical direction of the image sensor; and
   determining the preset movement distance according to the first resolution and the second resolution.

3. The method according to claim 1, wherein obtaining the high dynamic range image by compositing the one or more reference images and the raw image comprises:
   acquiring reference pixel values corresponding to respective pixel positions within an overlapped portion of the reference image overlapped with the raw image, in response to determining that a set of the one or more reference images does not cover the raw image;
   calculating an average value corresponding to a pixel position within the overlapped portion based on a raw pixel value corresponding to same pixel position in the raw image and the reference pixel value corresponding to same pixel position in the reference image; and
   obtaining the high dynamic range image based on average values corresponding to respective pixel positions within the overlapped portion and raw pixel values within a non-overlapped portion of the raw image non-overlapped with the reference images.

4. The method according to claim 1, wherein obtaining the high dynamic range image by compositing the one or more reference images and the raw image comprises:
   acquiring, from the one or more reference images, reference pixel values corresponding to respective pixel positions in the raw image, in response to determining that a set of the one or more reference images covers the raw image; and
   obtaining the high dynamic range image based on the reference pixel values corresponding to respective pixel positions in the raw image.

5. The method according to claim 2, wherein determining the preset movement distance according to the first resolution and the second resolution comprises:
   determining a quarter of the first resolution as the preset movement distance, in response to determining that the brightness distribution type is the vertical distribution; and
   determining a quarter of the second resolution as the preset movement distance, in response to determining that the brightness distribution type is the horizontal distribution.

6. The method according to claim 3, further comprising:
   performing an image recognition on the raw image and the set of the one or more reference images to determine whether the set of the one or more reference images covers the raw image.

7. An electronic device, comprising a housing, a micro-electro-mechanical system, an image sensor, a memory and a processor, wherein the micro-electro-mechanical system, the image sensor, the memory and the processor are arranged within the housing, the micro-electro-mechanical system is configured to control a movement of the image sensor, the processor is configured to run programs corresponding to executable program codes by reading the executable program codes stored in the memory, to:
   detect a brightness distribution type of a raw image captured after a central region of a field of view of the imaging system is exposed at an initial position by detecting a first difference between a pixel brightness of an upper half of a raw image and a pixel brightness of a lower half of the raw image, detecting a second difference between a pixel brightness of a left half of the raw image and a pixel brightness of a right half of the raw image, and determining the brightness distribution type of the raw image based on the first difference and the second difference;

trigger the micro-electro-mechanical system to move the image sensor to one or more reference positions according to the brightness distribution type and a preset movement distance, and capture one or more reference images after the central region is exposed at the one or more reference positions;

wherein triggering the micro-electro-mechanical system to move the image sensor of the imaging system to the one or more reference positions according to the brightness distribution type and the preset movement distance comprises:

in response to detecting that the first difference satisfies a preset threshold, determining that the brightness distribution type of the raw image is the horizontal distribution and triggering a first micro-electro-mechanical system to move the image sensor to the one or more reference positions along a positive direction and/or a negative direction of a vertical direction based on the preset movement distance;

in response to detecting that the first difference does not satisfy the preset threshold and the second difference satisfies the preset threshold, determining that the brightness distribution type of the raw image is the vertical distribution and triggering a second micro-electro-mechanical system to move the image sensor to the one or more reference positions along a positive direction and/or a negative direction of a horizontal direction based on the preset movement distance; and obtain the high dynamic range image by compositing the one or more reference images and the raw image.

8. The electronic device according to claim 7, wherein the processor is further configured to:

acquire a first resolution corresponding to a horizontal direction and a second resolution corresponding to a vertical direction of the image sensor; and determine the preset movement distance according to the first resolution and the second resolution.

9. The electronic device according to claim 7, wherein the processor is further configured to:

acquire reference pixel values corresponding to respective pixel positions within an overlapped portion of the reference image overlapped with the raw image, in response to determining that a set of the one or more reference images does not cover the raw image;

calculate an average value corresponding to a pixel position within the overlapped portion based on a raw pixel value corresponding to same pixel position in the raw image and the reference pixel value corresponding to same pixel position in the reference image; and obtain the high dynamic range image based on average values corresponding to respective pixel positions within the overlapped portion and raw pixel values within a non-overlapped portion of the raw image non-overlapped with the reference images.

10. The electronic device according to claim 7, wherein the processor is further configured to:

acquire, from the one or more reference images, reference pixel values corresponding to respective pixel positions in the raw image, in response to determining that a set of the one or more reference images covers the raw image; and obtain the high dynamic range image based on the reference pixel values corresponding to respective pixel positions in the raw image.

11. The electronic device according to claim 8, wherein the processor is further configured to:

determine a quarter of the first resolution as the preset movement distance, in response to determining that the brightness distribution type is the vertical distribution; and determine a quarter of the second resolution as the preset movement distance, in response to determining that the brightness distribution type is the horizontal distribution.

12. The electronic device according to claim 9, wherein the processor is further configured to:

perform an image recognition on the raw image and the set of the one or more reference images to determine whether the set of the one or more reference images covers the raw image.

\* \* \* \* \*